INVENTOR
JOHN R. WRIGHT
BY
Herbert C. Kimball
ATTORNEY

INVENTOR
JOHN R. WRIGHT
BY
Herbert C. Kimball
ATTORNEY

Feb. 2, 1960  J. R. WRIGHT  2,923,200
EYE TESTING INSTRUMENTS
Filed March 29, 1956  3 Sheets-Sheet 3
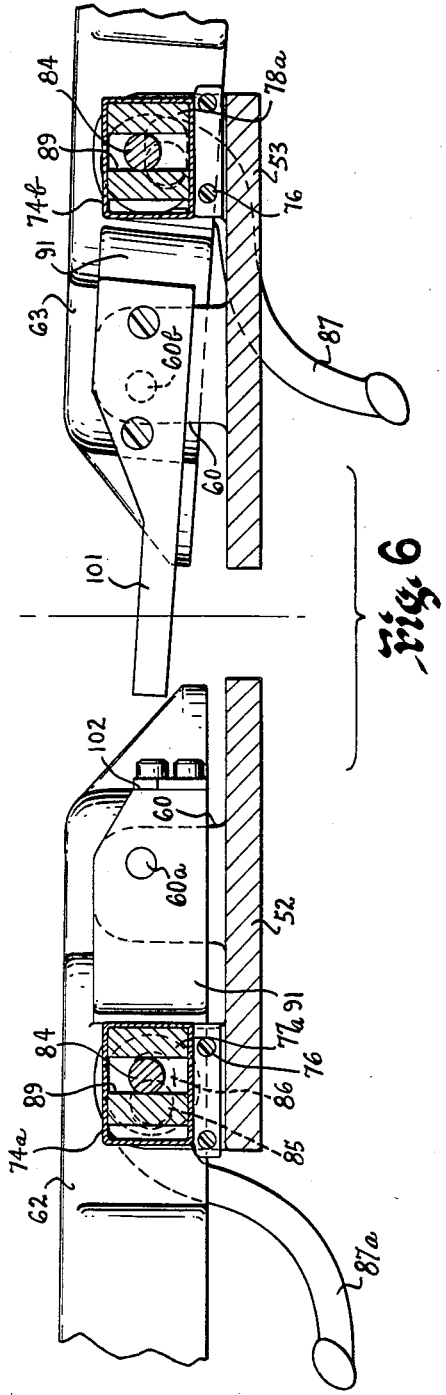
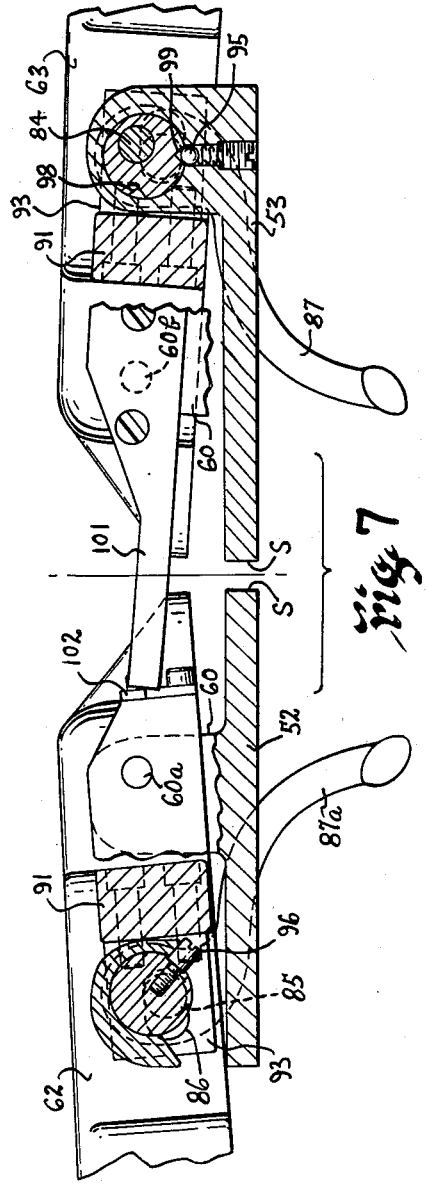
INVENTOR
JOHN R. WRIGHT
BY
Herbert C. Kimball
ATTORNEY

United States Patent Office 2,923,200
Patented Feb. 2, 1960

2,923,200

EYE TESTING INSTRUMENTS

John R. Wright, Eggertsville, N.Y., assignor to American Optical Company, Southbridge, Mass., a voluntary association of Massachusetts Application March 29, 1956, Serial No. 574,774

9 Claims. (Cl. 88—22)

This invention relates to ophthalmological instruments for determination of the lens values necessary to properly correct defective or improper vision of various individuals. Such instruments are customarily used for ascertaining such errors of vision both for "near," i.e. for reading and other close work, and for "distance," i.e. seeing distant objects. As the eyes change from "distance" to "near," as is well known, a convergence of the eyes takes place, and vice versa. In other words, the visual axes of the two eyes are substantially parallel for "distance" vision, but have an angular relation for "near." Testing instruments of the character here dealt with have test elements such as lenses which function less perfectly where the visual axis of the respective eye is not normal to the element.

It is an object of the present invention to overcome the disadvantage of previous instruments of this character that when the test elements are properly oriented for "distance" vision, they are cocked at an angle for "near."

In the drawings which show an illustrative form of my invention,

Figs. 6 and 7 are detail plan views, partly broken away, illustrating the interengagement of parts of the apparatus under different conditions of adjustment of the pupillary distance.

Figure 4:
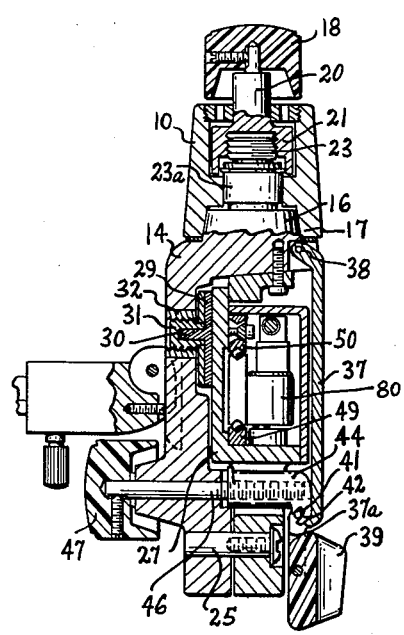
Fig. 4 is a central vertical sectional view on the line 4—4 in Fig. 1.

As is customary, the coupling 10 of the instrument is hung from a support 11 such as the crossbar of a floor stand or of a chair in which the patient is seated, being held in adjusted position on the support 11 by a lock knob 12. The coupling 10 adjustably carries a bracket 14 pivotally supporting the mechanism which adjusts the positioning of the two testing units to the eyes of the patient. As is shown in Fig. 4, the bracket is provided with a central collar which is surrounded by a depending outwardly tapering flange 17 of the coupling 10. Above the coupling is a knob 18, secured to an extension 20 of a nut 21 which is threaded on a head 23 which projects upwardly from the bracket 14. The lower portion 23a of the head is nicely journaled in the coupling 10, so that a smooth pivoting of the bracket takes place relative to coupling 10 unless locked thereto by engagement of the tapering flange 17 with collar 16. Such locking is brought about by rotation of the knob 18, which by virtue of the threaded engagement of the nut 21 with the head 23, elevates the bracket to wedge the collar 16 within the flange 17.

The bracket 14 mounts at its lower end a pivot pin 25. A transverse track 27 is adapted to tilt about the pivot pin 25 if released by the clamp 29 (see Fig. 1). As shown in Fig. 4 the clamp 29 is provided with a stud 30 which extends into a screw press 31. The press 31 is threaded within a sleeve 32 secured within the bracket 14, and carries arms 34 and 35 by which the screw press 31 can be quickly rotated to apply or release the clamp 29 to the opposed surface of the track 27. That is to say, the arms 34 and 35 are conveniently arranged for rotating the press 31 within its sleeve 32 to bring about bodily movement of the press 31 toward or away from the clamp 29, depending upon the direction in which the arms are turned, and the clamp 29 is accordingly applied or withdrawn.

On the patient side of the instrument, a link 37 hangs from a pivot 38 on the bracket 14. To the lower end of the link 37 in the form of a flange 37a is connected a forehead rest 39. A pin 41 on the flange 37a is engaged with a forked portion 42 of a pusher 44. The end of this pusher 44 engages the link 37 to move it, together with the rest 39, toward the patient. The forked portion 42 retracts the link 37 and the rest 39 in the opposite direction. Control means for the pusher 44 takes the form of a screw 46 threaded within the pusher 44 and rotatable by a control knob 47.

The track 27 carries opposed ways 49 and 50 of the ball bearing mountings of slides 52 and 53. The lower ways 49 are attached to the track 27 by stud bolts 55. The proper tension on the balls is obtained through the upper ways 50 by the wedging action of the wedge shaped washers 57 on the stud bolts 58. A tapered reaction member 59 above the bolts 58 helps to crowd the ways 50 downwardly until the proper tension on the balls is obtained. Each slide has sufficient length to give it stability, and each has a boss 60 receiving a pivot pin 60a or 60b on which one of the testing units 62 or 63 is pivoted.

Figure 1:
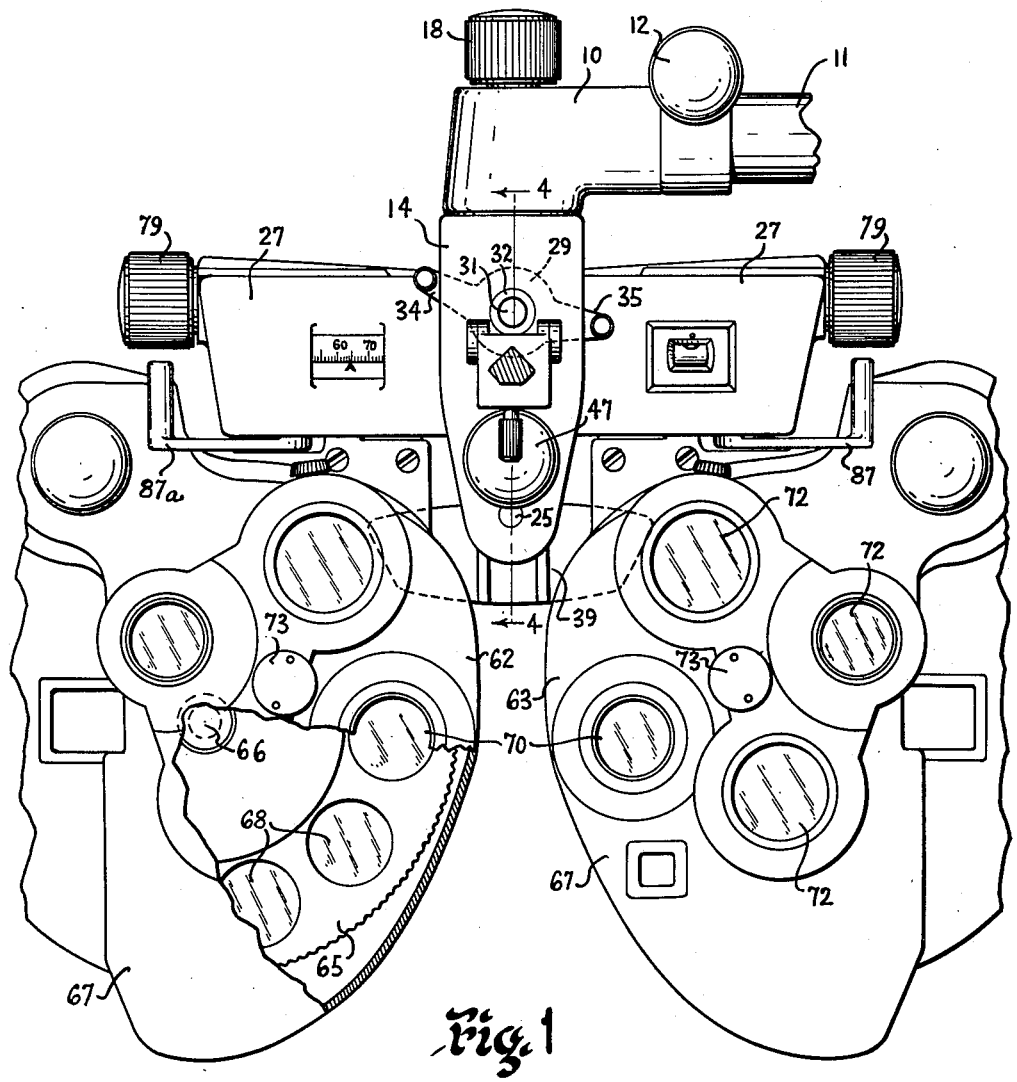
Fig. 1 is a front view in elevation partly broken away of eye testing apparatus embodying my invention. The apparatus as shown in this figure is set for "distance" vision.

These testing units are shown somewhat diagrammatically herein, as the details of their construction form no part of my invention. In general, as is well known, each testing unit places before its respective eye of the patient a selected test element. For this purpose one or more carriers are rotatably mounted in or on each testing unit on such an axis or axes as to place the selected test element on the visual axis of the respective eye. In Fig. 1 such a carrier is shown at 65 which is mounted in the housing 67 of the testing unit to rotate about the axis 66. A plurality of lens elements 68 for eye testing purposes are mounted in the carrier 65, which may be rotated to bring any selected test element into registry with the sight opening 70 of the testing unit. In similar fashion, a battery of test elements 72 are carried by a rotatable turret 73 mounted on the testing unit 62 or 63 so that a selected test element 72 may be brought into registry with the sight opening 70. One arrangement for mounting and rotating the carriers of the test lenses in the testing units is shown and described in the patent to Peck and Gradisar 2,266,797 granted December 23, 1941, but my invention is not restricted to any particular mounting and rotating means.

It is of course understood that patients vary in their facial characteristics. Even though the forehead of the patient engages the rest 39, the corneas of the eyes may be too far away or too close to the sight openings 70, and the rest 39 is made adjustable as above described in connection with knob 47 for the purpose of effecting the proper spacing of the eyes from the instrument.

Figure 2:
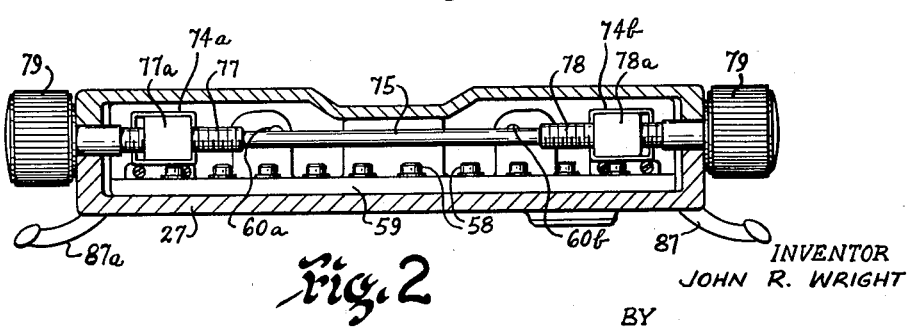
Fig. 2 is a view in horizontal section of the pupillary distance adjustment.

The so-called pupillary distance, which is the distance between the centers of the pupils of the individual patient is another factor in the adjustment of the instrument. When the patient is looking straight ahead at a distant object, the visual axes of the two eyes should register with the centers of the two sights openings 70. For the purpose of such registry, the slides 52 and 53 may be separated or brought closer together by mechanism shown more particularly in Figs. 2 and 3. A screw 75 with threads 77 of one characteristic (for instance, right hand) at one end and threads 78 of the opposite characteristic (for instance, left hand) at the other end cooperates with nuts 77a and 78a. The knobs 79 at the two ends make it convenient to turn the screw 75 and thereby move the nuts 77a and 78a closer together or further apart. The nuts are prevented from rotating with the screw 75 by nut retainers 74a and 74b respectively, which are in the form of open-topped boxes which hug the flat sides of the nuts for the above purpose. These boxes are secured to slides 52 and 53 respectively, by screws 76, and are longer than the nuts (see Fig. 6) for a purpose about to be explained.

Figure 5:
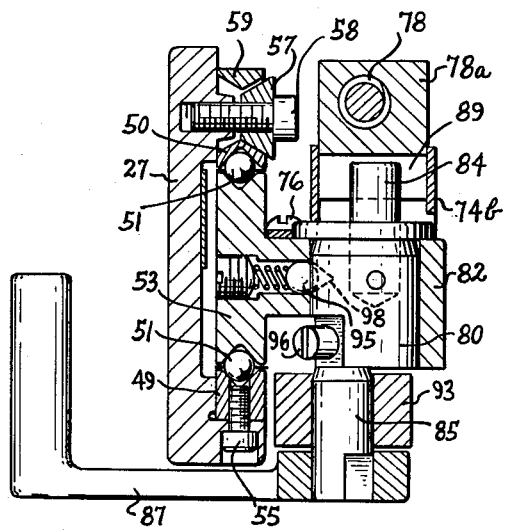
Fig. 5 is a vertical sectional view of the eccentric adjusting means taken on line 5—5 in Fig. 3.

As is apparent from Fig. 5 the nut 78a is not directly attached to slide 53, but is connected thereto through adjusting means 80 journaled in an extension 82 of the slide 53 and having eccentric connections to the nut 78a and to the testing unit 63. It will be understood that the corresponding eccentrics (not shown in detail view), connecting the nut 77a and the testing unit 62 to slide 52, will be the opposite (right or left) handed from the ones described and illustrated in Fig. 5. Adjusting means 80, as illustrated in Fig. 5 include an upper eccentric pin 84 and a lower eccentric pin 85. The latter carries the lever 87 (or 87a for the other adjustment) for rotating the adjustment between the two extreme positions, i.e. the position shown in Figs. 1, 3 and the left side of Fig. 6, and the position shown in Fig. 7 and the right side of Fig. 6. As is evident from Figs. 5 and 6, the rotation of adjustment means 80 in its journal in the extension 82 changes the relative position of the upper pin 84. In part, this eccentric motion of pin 84 causes it to move along the slot 89 in nut 78a, and in part the eccentric motion causes a lateral shift in the slide 53. The above mentioned extra space at the end of the respective nut retainer 74a or 74b permits this shift in the slide (to which the nut retainer is secured by screws 76).

It would be helpful at this point to review the positioning of the patient's head with relation to the instrument. The patient, who is generally seated, rests the forehead against the rest 39. By turning the control knob 47 the closeness of the patient's head to the instrument is adjusted until the corneas of the eyes are at the proper distance from the sight openings 70. Pupillary distance is taken care of by rotating one of the knobs 79 until the correct separation of the slides 52 and 53 and of the testing units hung therefrom is obtained. Correct separation is arrived at when the visual axes of the two eyes, when looking at a distant object, coincide with the centers of the sight openings 70.

Figure 3:
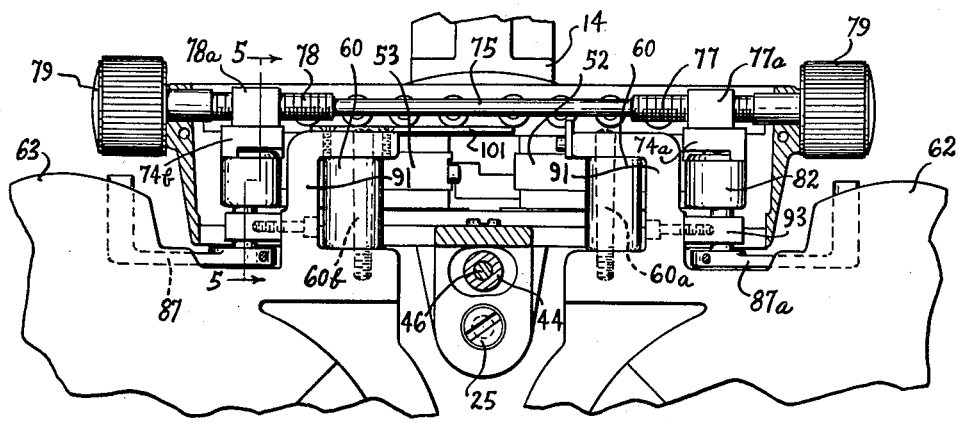
Fig. 3 is a rear view (i.e. from the patient's side) in elevation of the apparatus shown in Fig. 1, the lower portion of the two testing units and the forehead rest being broken away.

With the testing units and the levers 87 and 87a arranged as shown in Figs. 1 and 3 and the left side of Fig. 6, the test elements, such as the test lenses 68, in the sight openings 70 are normal to the visual axis for distance vision. Should the patient's eyes converge for near vision there is no longer the same relation between the plane of a test element and the visual axis of the respective eye. To correct for this convergence of the patient's eyes, a correction which amounts on the average to about 4½ degrees (contrast the left and right sides of Fig. 6), the entire testing unit is swung about a vertical axis passing through the center of the sight opening 70.

This is made possible because a yoke 91 on the upper portion of each testing unit is pivoted on that axis to the pin 60a or 60b as the case may be. Through this yoke 91 the testing unit is allowed to pivot relative to slide 52 or 53, as the case may be, on a vertical axis passing through the sight opening 70. The lower eccentric pin 85 which is confined in a slot 86 (see Fig. 7) in an extension 93 of the yoke 91 causes it to so pivot when the lever 87 or 87a rotates the adjusting means 80. A click 95 is adapted to drop into one of two depressions in the adjusting means 80. When the lever 87 (or 87a) is in the position shown in Figs. 1 and 3, the click 95 drops into the depression 98, and into a depression 99 when in the position shown in Fig. 7. These two depressions tend to maintain the instrument in either extremity of adjustment. A stop 96 limits rotation of the means 80.

The usual variations in pupillary distance are taken care of by the screw 75, and at such times the adjustments 80 have no function, as the movements of the nuts 77a and 78a are transmitted as though the pins 84 were fixed in the slides 52 and 53. When, however, the patient's eyes are to be directed to a near object with consequent convergence, the levers 87 and 87a are swung to the positions shown in Fig. 7. This has two effects simultaneously: the pin 85 moving in the slot 86 in the extension 93 of the yoke 91 swings the latter slightly on the pivot pin 60a or 60b as the case may be; and the pin 84 moving in the slot 89 of nut 77a or 78a modifies slightly the pupillary distance. It has been found that, on the average, the swing of the yoke 93 should be four and one-half degrees in from straight ahead distance vision, while the pupillary distance should be modified about two mm. at each end or a total of about four mm. These figures are on the basis that the cornea of the eye is positioned thirteen mm. behind the nearest test lens, and that a reading card is held at a distance of sixteen inches for the "near" test.

Should the pupillary distance for the patient being examined be on the low side, there is less need for the 4½ degree angling of the testing units, and if the pupillary distance is definitely sub-normal the need for the angling disappears. Referring to Figs. 6 and 7, it will be noted that a tongue 101 is carried by the testing unit which is hung on slide 53, and a stop 102 is carried by the other testing unit. Assuming that the testing units are arranged for straight ahead vision (as in Fig. 1 and the left side of Fig. 6), the tongue 101 by-passes the stop 102, and the slides 52 and 53 may be caused to approach each other until their ends S and S contact each other. At this minimum setting of pupillary distance, the tongue 101 is held behind the stop 102 so that the levers 87 and 87a cannot be swung. If the tongue 101 is behind the stop 102 but is not so far in as the described (minimum) setting, some amount of pivoting to angle the testing units is possible. When the pupillary distance is large enough so that the tongue 101 escapes from behind the stop 102, the full amount of pivoting is possible.

From still another point of view, if the levers 87 and 87a are swung to fully angle the testing units, the slides 52 and 53 cannot be made to approach closer than the position shown in Fig. 7 because the tongue 101 engages the stop 102. It has been found that good results are obtained if, when the testing units are set for 55 mm. pupillary distance for "distance" vision, they can be fully angled for "near" (thereby slightly reducing the pupillary distance) and cause the tongue 101 to then reach the stop 102. Slightly below 55 mm. the tongue 101 will engage the stop 102 before full angling has been accomplished, and still less angling is possible as the pupillary distance is decreased.

The angling of the testing units 62 and 63 for "near vision" improves the accuracy and effectiveness of the instrument, since it positions the test elements in the normal relation to the visual axes where distortion is at a minimum. The interengagement of parts of the testing units so as to limit the angling of these units when the pupillary distance is on the low side is a convenience to the practitioner by automatically controlling the angling where it is not desirable.

Having described my invention, what I claim is:

1. Eye testing apparatus, comprising a pair of testing units, each including a rotatable carrier for a plurality of test elements and adapted to place a selected test element on the visual axis of the respective eye of a patient, and common mounting means for said test units having a pair of slides, a hinge pivotally mounting each of said units on a slide, a transverse track for said slides, mechanism having a connection to each slide for varying the separation of said slides together with the testing units carried thereby, and a supplementary eccentric connecting at least one of said units to its respective slide, said eccentric being operative simultaneously to pivot said unit on its hinge and to shift said connection between said separation mechanism and the respective slide whereby operation of said eccentric varies the angle at which the respective eye looks through the selected test element and simultaneously adjusts the spacing of said units.

2. Eye testing apparatus comprising a pair of testing units, each including a rotatable carrier for a plurality of test elements and adapted to place a selected test element on the visual axis of the respective eye of a patient, and common mounting means for said test units having a pair of slides, bearing means pivoted to each slide on a substantially vertical axis for pivotally mounting a testing unit thereon, a transverse track for said slides, mechanism for varying the separation of said slides together with the testing units pivoted thereto, said mechanism having an extensible and contractible connection to each slide, and a manually operable control device for swinging at least one of said units relative to its slide about said vertical axis and for simultaneously adjusting said connection between said mechanism and the respective slide to alter the separation of said units without changing the setting of said mechanism.

3. Eye testing apparatus comprising a pair of testing units, each including a housing and a carrier rotatably mounted in said housing for a plurality of test elements, each carrier being adapted to place a selected test element in a sight opening on the visual axis of the respective eye of a patient, and common mounting means for said test units having a pair of slides, a hinge pivotally mounting each housing for swinging about a vertical axis passing through said sight opening, a transverse track for said slides, mechanism for varying the separation of said slides together with the testing units carried thereby, and a rotatable control member mounted in each slide, said control member having a connection with its respective test unit for swinging the same on its hinge to vary the angle at which the respective eye looks through the selected test element and a second connection with said separation mechanism for simultaneously effecting a change in the separation of said test units.

4. Eye testing apparatus comprising a pair of testing units, each including a housing and a carrier rotatably mounted in said housing for a plurality of test elements, each carrier being adapted to place a selected test element in a sight opening on the visual axis of the respective eye of a patient, common mounting means for said test units having a pair of slides, a hinge pivotally mounting each housing for swinging about a vertical axis passing through said sight opening, a transverse track for said slides, mechanism for varying the separation of said slides together with the testing units carried thereby, and a control member rotatably mounted on at least one slide, said control member having an eccentric connection with its respective test unit for swinging the same on its hinge to vary the angle at which the respective eye looks through the selected test element and a second connection with said separation mechanism for simultaneously effecting a change in the separation of said test units, and means on said housings operative when the separation of said housings is below a predetermined minimum to interengage so as to limit the said pivotal movement.

5. Eye testing apparatus comprising a pair of testing units, each including a housing and a carrier rotatably mounted in said housing for a plurality of test elements, each carrier being adapted to place a selected test element in a sight opening on the visual axis of the respective eye of a patient, common mounting means for said test units having a pair of slides, a yoke pivotally mounting each housing on one of said slides with the axis of pivoting extending substantially vertically through the respective sight opening, a transverse track for said slides, mechanism for varying the separation of said slides together with the testing units mounted thereon, a supplementary control means rotatably mounted in a portion of at least one of said slides, said supplementary control means having an eccentric for turning its respective unit on its pivot and a second eccentric connecting its respective slide with said separation mechanism whereby said supplementary control means is operable simultaneously to vary the angle at which the respective eye looks through the selected test element and to effect a variation of the separation of said pair of units.

6. Eye testing apparatus comprising two testing units each including a housing containing a carrier for a plurality of test elements, each carrier being rotatable in a vertical generally transverse plane to bring a selected test element into a sight opening in said housing before the respective eye of a patient, and common mounting means for said test units having a transverse track, two slides mounted on said track, a hinge substantially at the top of each unit for pivotally suspending said unit below its respective slide, said hinge being offset rearwardly from its respective slide and comprising a rearward extension from said slide and a yoke on said testing unit connected by a hinge pin for pivoting on a substantially vertical axis extending through the center of said sight opening, pupillary distance mechanism for varying the separation of said slides together with the testing units carried thereby, and an eccentric connecting each of said units to its respective slide, said eccentric having a manual control extending below said slide for turning said unit on its hinge relative to said slide to vary the angle at which the respective eye looks through its sight opening.

7. Eye testing apparatus comprising a pair of testing units each including a housing containing a carrier for eye testing elements, each carrier being rotatable to bring the test elements carried thereby successively into a sight opening in said housing before the respective eye of a patient, and common mounting means for said test units, said mounting means having a transverse track and a pair of slides mounted on said track, pupillary distance mechanism operable for changing the spacing of said slides together with said test units, each housing being suspended below one of said slides by a hinge pivoting the respective housing to its slide on a substantially vertical axis extending through said sight opening, and a manually rotatable eccentric on said mounting means having a connection with at least one of said carriers for turning the respective carrier on said hinge and simultaneously shifting its slide laterally to vary the separation between said carriers.

8. Eye testing apparatus comprising a pair of testing units, each being an assemblage of test elements for the respective eye of a patient and each including a rotatable carrier for presenting a selected one of a plurality of said test elements on the visual axis of said eye, common mounting means for said test units having a pair of slides, a hinge mounting each of said units on a slide for pivoting about a substantially vertical axis and a transverse track for said slides, pupillary distance mechanism having a connection to each slide for varying the separation of said slides together with the testing units carried thereby and a manually operable adjustment device in the connection to at least one of said units for adjusting said connection and changing the spacing of said units without changing the setting of said pupillary distance mechanism, said adjustment device being also connected to the respective unit for turning said unit on its hinge to vary the angle at which the respective eye looks through the selected test element.

9. Eye testing apparatus as defined in claim 13 in which said testing units are provided with stop portions adapted to overlap when the pupillary distance is lowered below a predetermined amount and to interfere so as to thereby limit the angling of a testing unit relative to its slide.

References Cited in the file of this patent

UNITED STATES PATENTS

| | | |
|---|---|---|
| 749,046 | Folmer et al. | Jan. 5, 1904 |
| 1,842,458 | Meyrowitz | Jan. 26, 1932 |
| 2,095,235 | Ames | Oct. 12, 1937 |
| 2,147,957 | Ames | Feb. 21, 1939 |
| 2,266,797 | Peck et al. | Dec. 23, 1941 |
| 2,337,898 | Jobe et al. | Dec. 28, 1943 |

FOREIGN PATENTS

| | | |
|---|---|---|
| 24,620 | Great Britain | of 1901 |

UNITED STATES PATENT OFFICE

CERTIFICATE OF CORRECTION

Patent No. 2,923,200                              February 2, 1960

John R. Wright

It is hereby certified that error appears in the printed specification of the above numbered patent requiring correction and that the said Letters Patent should read as corrected below.

Column 7, line 3, for the claim reference numeral "13" read -- 6 --.

Signed and sealed this 23rd day of August 1960.

(SEAL)
Attest:

KARL H. AXLINE
Attesting Officer

ROBERT C. WATSON
Commissioner of Patents